US006210611B1

(12) United States Patent
Needham et al.

(10) Patent No.: US 6,210,611 B1
(45) Date of Patent: Apr. 3, 2001

(54) METHODS FOR PRODUCING GAS MICROBUBBLES HAVING LIPID-CONTAINING SHELLS FORMED THEREON

(75) Inventors: David Needham; Dennis Heejong Kim, both of Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/451,627

(22) Filed: Nov. 30, 1999

(51) Int. Cl.$^7$ .............................. B01J 13/02; A61K 9/127
(52) U.S. Cl. ......................... 264/4.3; 264/4.33; 264/4.4; 424/450; 424/455; 514/78
(58) Field of Search ................. 264/4.3, 4.33, 264/4.4; 424/450, 455; 514/78

(56) References Cited

U.S. PATENT DOCUMENTS

| | | | |
|---|---|---|---|
| 4,684,479 | 8/1987 | D'Arrigo | 252/307 |
| 4,774,958 | 10/1988 | Feinstein | 128/660.01 |
| 4,957,656 | 9/1990 | Cerny et al. | 252/311 |
| 5,352,436 | 10/1994 | Wheatley et al. | 424/9 |
| 5,406,950 | 4/1995 | Brandenburger et al. | 128/662.02 |
| 5,519,984 | 5/1996 | Beussink et al. | 53/489 |
| 5,597,549 | * 1/1997 | Schneider et al. | 424/9.51 |
| 5,705,187 | 1/1998 | Unger | 424/450 |
| 5,733,572 | * 3/1998 | Unger et al. | 424/450 |
| 5,776,429 | * 7/1998 | Unger et al. | 424/9.52 |
| 5,827,533 | 10/1998 | Needham | 424/450 |

FOREIGN PATENT DOCUMENTS

| 0554213 B1 | 8/1993 | (EP) | A61K/49/00 |
|---|---|---|---|
| WO 96/26746 | * 9/1996 | (WO) . | |

OTHER PUBLICATIONS

Marsh; CRC Handbook of Lipid Bilayers, CRC Press, pp. 121–122, 135–136, 195–197 (1990).
Van Vlack; Elements of Materials Science and Engineering, Sixth Edition, Addison–Wesley Publishing Company, pp. 112–113, 217–220, 223–226, 292–301, 313–319 (1989).

Tanford; Solubility of Amphiphiles in Water and Organic Solvents, The Hydrophobic Effect: Formation of Micelles and Biological Membranes, Second Edition, John Wiley & Sons, pp. 14–20 (1980).

Epstein et al.; On the Stability of Gas Bubbles in Liquid–Gas Solutions, The Journal of Chemical Physics 18:11 1505–1509 (1950).

Fox et al.; Gas Bubbles with Organic Skin as Cavitation Nuclei*, The Journal of the Acoustical Society of America 26:6 984–989 (1954).

Klibanov et al.; Amphipathic Polyethyleneglycols Effectively Prolong the Circulation Time of Liposomes, FEBS Letters 268:1 235–237 (1990).

Manley; Change of Size of Air Bubbles in Water Containing a Small Dissolved Air Content, British Journal of Applied Physics 11:38–42 (1960).

Phillips et al.; Monolayer Characteristics of Saturated I,2–Diacyl Phosphatidylcholines (Lecithis) and Phosphatidylethanolamines at the Air–Water Interface, Biochim. Biophys. Acta. 163:301–313 (1968).

Schäfer et al.; Phagocytosis and Degradation of Human Serum Albumin Microspheres and Nanoparticles in Human Macrophages, J. Microencapsulation 11:3 261–269 (1994).

Strasberg; Onset of Ultrasonic Cavitation in Tap Water*, The Journal of the Acoustical Society of America 31:2 163–176 (1959).

* cited by examiner

Primary Examiner—Samuel A. Acquah
(74) Attorney, Agent, or Firm—Myers, Bigel, Sibley & Sajovec, P.A.

(57) ABSTRACT

A method for producing a gas microbubble comprises subjecting the gas microbubble to isothermal conditions or cooling conditions such that the lipid-containing shell cools at a rate ranging from about $10^{0°}$ C./min. to about $10^{3°}$ C./min., and wherein said subjecting step transforms the lipid-containing shell from a liquid state to a solid state.

19 Claims, 8 Drawing Sheets

METHODS FOR PRODUCING GAS MICROBUBBLES HAVING LIPID-CONTAINING SHELLS FORMED THEREON

FIELD OF THE INVENTION

The present invention generally relates to methods for producing gas microbubbles having lipid-containing shells formed thereon.

BACKGROUND OF THE INVENTION

It is generally known that free gas microbubbles with an interfacial tension are prone to dissolution, even in gas saturated solution as a consequence of the Laplace pressure across the gas-liquid interface. The Laplace pressure is believed to act as a driving force for the diffusion of gas from the bubble to the surrounding environment (see Epstein et al. *J. Chem. Phys.* 18(11): 1505–1509 (1950)). Stabilization of microbubbles against such dissolution may be achieved by the creation of a shell, typically composed of either a protein (e.g., denatured albumin) or a surfactant such as phospholipid, present at the surface of the bubble (see, Fox et al., *The Journal of the Acoustical Society of America*, 26(6): 984–989 (1954); Strasberg, M. *Journal of the Acoustical Society of America* 31(2): 163–176 (1959); and Manley, *British Journal of Applied Physics* 11(January): 38–42 (1960)). Protein-coated contrast agents that are air-filled (such as, for example, Albunex™ sold by Molecular Biosystems, San Diego and Mallinckrodt, St. Louis) or perfluorocarbon-filled (such as, for example, Optison™ sold by Molecular Biosystems, San Diego and Mallinckrodt, St. Louis) are currently approved for medical use.

Notwithstanding any potential advantages of albumin materials, the use of phospholipid may be very desirable. More particularly, the amphiphilicity of the lipid molecule may cause it to spontaneously order itself at an air-water interface in such a way that the hydrophilic headgroup region of the lipid is exposed to the aqueous phase, while the hydrophobic tail region is oriented toward the air (see Tanford, C. *The Hydrophobic Effect: Formation of Micelles and Biological Membranes*. New York. John Wiley & Sons, Inc.1980). Therefore, phospholipid tends to self-assemble and form a monolayer shell at the surface of a gas bubble, under appropriate temperature and salt concentration conditions. In contrast to phospholipid, denatured albumin tends to form unoriented multilayers.

In addition, a wealth of data on the properties and structure of phospholipid has been established (see Marsh, D. *CRC Handbook of Lipid Bilayers*. Boca Raton, CRC Press (1990)). As an example, the temperature-dependent phase behavior (transition between liquid crystalline and gel states) of the phospholipid materials used to create shells is typically defined in bilayers and, to some extent, in monolayers as well. Conversely, in a fused, denatured shell, albumin is believed to have no phase transition.

Advantageously, phospholipid may be readily derivatized with fluorescent, polymeric, or binding moieties via chemical modification. Coated microbubbles can thus be tagged with dye markers for structural studies, engineered to potentially avoid uptake and extravasation in the body. The coated microbubble can be targeted to specific in vivo sites. These chemical groups, attached to lipid headgroups, tend to be precisely oriented at the surface of the shell. Not being bound by any theory, the orientation is believed to be possibly caused by the spontaneous arrangement of lipid at the bubble surface such that all headgroups are oriented toward the external aqueous medium. Albumin shells are believed to differ in that their preferential orientation of surface derivatized groups is difficult if not impossible to achieve.

Furthermore, phospholipid shells on microbubbles are capable of accommodating surface area changes of at least 40 percent for condensed monolayers. Such accommodation may be due to the ability of phospholipid monolayers to expand through multiple phase transitions (i.e., liquid condensed, liquid expanded, as the lateral surface pressure is reduced and the area per lipid molecule is increased). (see Phillips, M.C., et al., *Biochimica et Biophysica Acta,* 163: 301–313 (1968)). In comparison, albumin shells tend to be rigid, and, for the most part, are often incapable of greater than 5 percent expansion. The expansion of the shells may be an important performance parameter in certain applications. For example, as microbubbles subjected to ultrasound particles are believed to undergo cycles of expansion and contraction.

The employment of phospholipid is also advantageous since it is generally biocompatible. Although deposition of albumin to a surface can passivate the surface to certain types of adhesion, denatured albumin on a surface may possibly act as a specific ligand for MAC-1, a receptor on white blood cells. Shafer et al. propose that denatured albumin nano- and micro-spheres incubated with macrophages were phagocytosed within two hours (see Shafer, V. et al., *Journal of Microencapsulation* 11(3): 261–269 (1994)). The "stealthy" phospholipid vesicles composed of a lipid/PEG-lipid mixture has been shown to evade the reticuloendothelial system and exhibit prolonged blood circulation times (e.g., half-life of five hours) relative to non-PEGylated vesicles (half-life of less than 30 minutes) (see, Klibanov, et al., *FEBS Letters,* 268(1): 235–237 (1990)). Thus, depending on the system and the application, the ability of albumin-coated microbubbles to stimulate macrophages and neutrophils may or may not be advantageous. With the lipid-coated microbubbles though, the ability to express the PEG coating with specific molecular ligands for macrophages or neutrophils as desired is believed to be advantageous over the simple albumin microsphere, and allows these interactions to be controlled, (elicited or suppressed depending on the application).

Notwithstanding the above, there remains a need in the art for methods of forming gas microbubbles with lipid-containing shells that allow for one to better control the physical properties of the shells in the microbubbles such that they are suitable for various applications.

SUMMARY OF THE INVENTION

In one aspect, the invention provides a method for producing a gas microbubble having at least one lipid-containing shell formed thereon. The method comprises subjecting the gas microbubble to isothermal conditions or cooling conditions such that the lipid-containing shell cools at a rate ranging from about $10^{0°}$ C./min to about $10^{3°}$ C./min). The subjecting step transforms the lipid-containing shell from a liquid state to a solid state at a rate dependent upon the cooling rate or isothermal conditions applied. By virtue of the method of the invention, Applicants are able to control the physical properties of the lipid shells on the gas microbubbles in a manner not taught or suggested by the prior art.

BRIEF DESCRIPTION OF THE DRAWINGS

FIGS 1A and B shows the (A) yield shear and (B) shear viscosity respectively of DSPC:PEG Stearate (91:9 molar)

coated microbubbles as functions of the cooling rate applied during bubble preparation.

DETAILED DESCRIPTION OF THE INVENTION

The invention will now be described with reference to the preferred embodiments set forth herein. It is to be understood however that these embodiments are for illustrative purposes only, and are not intended to limit the invention as defined by the claims set forth herein.

In one aspect, the invention provides a method for producing a gas microbubble. In a preferred embodiment, the method is carried out in a surrounding liquid medium. Preferably, the term "microbubble" refers to gas bubbles having a diameter on the order of from about 1 to about 10 microns ($\mu$m). The gas microbubble has at least one lipid-containing shell formed thereon. The method comprises subjecting the gas microbubble to isothermal conditions or cooling conditions such that the lipid-containing shell cools at a rate on the order of magnitude of from about $10^{0°}$ C./min. to about $10^{3°}$ C./min, preferably cooling the gas microbubble from a temperature above the phase transition temperature of the lipid-containing shell. The cooling rate may be variable or constant. In accordance with the invention, the subjecting step transforms the lipid-containing shell from a liquid state to a solid (e.g., gel) state. In particular, the method of the invention is able to control the rate of transition of the lipid material from its liquid state to its solid state during the formation of shells on gas bubbles, and this is believed to highly influence the nature of the shell, which in turn, is able to highly influence its mechanical properties. The coated microbubbles are therefore advantageous in various applications such as, for example, ultrasound. For example, the properties of the microbubble shell are capable of influencing the way ultrasound interacts with the coated microbubble and determining the nature of the signal generated from such insonification. Preferably, the shells are present in the form of monolayers.

The gas microbubbles may be produced according to techniques that are known to one skilled in the art. For example, the microbubbles may be produced by a sonication technique such as proposed in U.S. Pat. Nos. 4,774,958 to Feinstein; 4,957,656 to Cerny et al.; and 5,352,436 to Wheatley et al., the disclosures of which are incorporated herein by reference in their entirety. An example of commercially preferred equipment employed in producing the microbubbles is a Misonix Model XL2020 sold by Misonix of Farmingdale, N.Y.

Various lipid materials may be employed in the lipid-containing shells of the invention. Preferably, the lipid-containing shell is in the form of a monolayer although other structures may be formed on the microbubbles. Examples of lipids that may be employed in the shells include, but are not limited to, phospholipids, such as those described in U.S. Pat. No. 5,827,533 to Needham and pending U.S. application Ser. No. 09/099,668 filed Jun. 18, 1998, the disclosures of which are incorporated herein by reference in their entirety. Exemplary phospholipids include, without limitation, 1, 2-distearoyl-sn-glycero-3-phosphatidylcholine (DSPC) ($T_c$=55° C.), 1,2-dipalmitoyl-sn-glycero-3-phosphatidylcholine (DPPC), 1,2-diarachidoyl-sn-glycero-3-phosphatidylcholine (DAPC), 1,2-dibehenoyl-sn-glycero-3-phosphatidylcholine (DBPC), 1,2-dilignoceroyl-sn-glycero-3-phosphatidylcholine (DLgPC), 1, 2-Dipalmitoyl-sn-Glycero-3-[Phospho-rac-(1-glycerol)] (DPPG) ($T_c$=41.50°C.), phosphatidylcholine, phosphatidylethanolamine, phosphatidic acid, phosphotidylglycerol, phosphatidylinositol, and sphingolipids such as sphgomyelin. Glycolipids may also be used such as, for example, cerebrosides and gangliosides. These lipids may be made in accordance with techniques known to one in the art. In one embodiment, the phospholipid may be employed in an amount ranging from about 65 to about 80 percent based on the weight of the lipid-containing shell.

In certain embodiments, various polymers may be grafted onto the lipids and/or surfactants and thus may be part of the lipid-containing shell formed on the gas microbubble. Exemplary polymer-surfactants include but are not limited to polyethylene glycol stearate (e.g., PEG 40 stearate) and PEGylated phospholipid (e.g., PEG-PE). If employed, the lipid-containing shell preferably comprises from about 20 to about 35 percent by weight of polymer-lipid.

Optionally, the lipid-containing shell of the invention may comprise a surface-active agent, such as, for example, a surface active agent that is relatively water-soluble. Exemplary surface active agents include, but are not limited to, PEGylated surfactant, lysolipid (e.g., monopalmitoyl-phosphatidylcholine (MPPC)), palmitoyl alcohols, stearoyl alcohols, palmitoyl, stearoyl, polyethylene glycol, glyceryl monopalmitate, glycerol, monooleate, ceramides, PEG ceramides, and therapeutic lipids (e.g, C-18 ether linked lysophosphatidylcholine). If employed, the lipid-containing shell preferably comprises from about 20 to about 35 percent by weight of surface active agent. Other materials may also be incorporated into the shells such as cholesterol, and other mixed lipid systems, particularly ones that confer targetability to the lipid coated gas bubble.

The lipid-containing shells may comprise other optional materials. For example, a suitable material can be employed to visualize the microstructure using various techniques (e.g., fluorescence microscopy). As an illustration, about 0.1 mole percent of a fluorescently-labeled lipid may be included to mark the grain boundaries in the lipid-containing shell. It is believed that such fluorescently labeled lipids may be excluded from the main microcrystalline domains and concentrate in the grain boundaries.

In a preferred embodiment, lipid-containing shells having a purity of greater than 99 percent can be obtained. The components employed in making the lipid-containing shells can be codissolved in solvent (e.g., chloroform) to potentially provide adequate mixing. The solvent may be completely removed by a suitable technique (e.g, water trap evaporation) and the dried sample rehydrated with a proper aqueous solution (e.g., phosphate-buffered saline, PBS). If desired, the shells may then be incubated using an appropriate procedure. For example, the shells may be incubated for four hours at about 60° C. to about 65° C. in the embodiment of shells comprised of DSPC and PEG stearate.

A number of isothermal conditions can be employed in the method of the invention. Preferred isothermal conditions may include, for example, exposing the gas microbubble (and more particularly, the lipid-containing shell) to a dehydrating agent, exposing the gas microbubble to an electrolyte solution, and altering the surface charge density of the lipids in the lipid-containing shell in order to transform a liquid shell into a solid one.

If selected for use, various dehydrating agents may be employed. Examples of dehydrating agents include, but are not limited to, a polymer such as polyethylene glycol, dextran, or polyvinylpirrolidine (PVP). The polymer preferably has an average molecular weight equal to or greater than about $10^4$ daltons. As an illustration, the polymer preferably may have an average molecular weight equal to or greater than about $10^4$ daltons in the case of PEG or PVP, and equal to or greater than about $10^5$ daltons in the case of dextran sufficient to create a significant osmotic pressure. In one embodiment, the polymer is applied in the form of a solution comprising the polymer.

Various solutions comprising electrolytes may be used in the method of the invention, the selection of which is known to one who is skilled in the art. Examples of suitable electrolytes include, but are not limited to, physiological buffers and salt solutions (e.g., NaCl). The electrolytes may be employed in an aqueous solution. The electrolyte concentration may be varied from zero to physiological conditions. In the event that an isothermal process is carried out using an electrolyte, once the isothermal transition has occurred, the method of invention may also further include reducing the temperature of the gas microbubble back to room temperature or the desired working temperature and removing the gas microbubble from the solution comprising the electrolyte. These methods may be carried out according to techniques known to one who is skilled in the art.

The isothermal technique according to the present invention may also be carried out by altering the surface charge density of the lipid in the lipid-containing shell. Although not wishing to be bound by theory, Applicants believe that a liquid-to-solid transformation of the lipid-containing shell may be achieved by neutralizing charged lipids so that intermolecular, intramonolayer repulsion is attenuated, thus allowing lipids to potentially pack more closely and undergo an isothermal transition to the gel state.

The method of the invention may also be carried out by subjecting the gas microbubbles (and hence the lipid-containing shells) to cooling conditions such that the lipid-containing shells cool at a rate within the range of from about $10^0°$ C./min. to about $10^{3°}$ C./min. such that the lipid-containing shell is transformed from a liquid state to a solid or gel state. The cooling operation can be achieved by techniques and equipment known to one who is skilled in the art. In various embodiments, samples of gas microbubbles having lipid-containing shells formed thereon are placed in a suitable container (e.g., vial) and subjected to a suitable cooling medium. As shown in FIGS. 2A through D, examples of cooling procedures include, but are not limited to, placing a container in a loosely capped thermos and allowing the sample to cool, placing a container in an aqueous medium (e.g., tap water) at ambient temperature and allowing the sample to cool, and placing a container in a cold water bath and allowing the sample to cool. If desired, the above cooling techniques can be used in conjunction with suitable stirring or agitation (e.g., magnetic bar) so as to provide for a potentially more uniform cooling of the sample. Also, the temperature may be maintained by circulating a suitable cooling medium (e.g., cold water) through a heat exchanger (e.g., coil) that is immersed in the bath. If desired, the above cooling techniques can be optimized by isolation of the cooling vessel to minimize or potentially eliminate variations in room temperature.

Figure 1A:
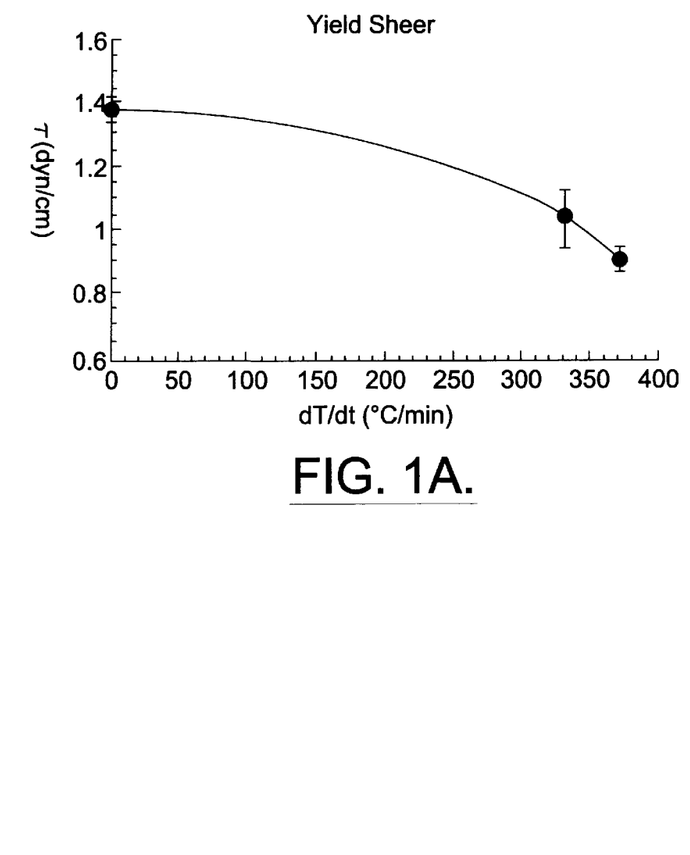
Figure 1B:
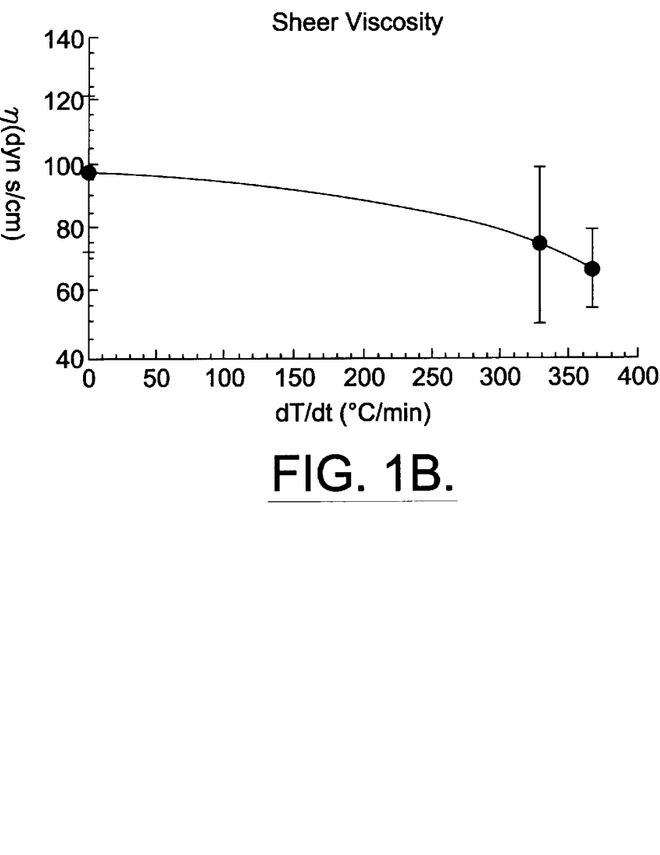

Although not wishing to be bound by theory, Applicants believe that the solid (e.g., gel) micro-structures of the lipid-containing shells are affected by the methods of the invention, and as an example the cooling rates to which the shells are subjected. Thus, the invention is useful in that the physical properties of the shells can be controlled in a manner not taught in the art. More specifically, when lipid-containing shells are subjected to slower cooling rates (e.g., on the order of about $10^{0°}$ C./min.), the shells may exhibit increasing yield shear and shear viscosity, as illustrated in FIGS. 1A and 1B. Not wishing to be bound by theory, it is believed that shells organized in large domains exhibit greater resistance to shear deformation than shells composed of many smaller domains.

The methods of the invention may comprise steps additional to those described above. For example, with respect to subjecting the microbubbles to isothermal conditions, the methods may also comprise reducing the temperature of the gas microbubble and removing the gas microbubble from the surrounding liquid medium.

Also, certain microstructures may also be changed by annealing (heating the shell-microbubbles to just below the transition temperature of the lipid where grain and other defect reorganization can occur) and then cooling back to room temperature or the desired working temperature.

The microbubbles having lipid-containing shells formed thereon are advantageous in that they may be suitable for injection into a human for diagnostic ultrasound. Thus, the invention allows for better control of the shell physical properties than is believed to currently take place according to conventional techniques.

The examples which follow are set forth to illustrate the present invention, and are not to be construed as limiting thereof. In the examples, the gas microbubbles were formed by probe sonication of the lipid suspension taking place for 3 minutes at medium power (e.g., approximately 80 Watts) to disperse the lipid. Subsequently, the lipid suspension was sonicated at high power (e.g., approximately 105 Watts for 30 seconds) to produce the microbubbles. Entrained air was used to produce the microbubbles, although other procedures may be employed that may also use other gases such as, for example, fluorocarbons.

The lipid shell films were formed using DSPC sold by Avanti Polar Lipids of Alabaster, Ala. and having a gel-to-liquid crystalline phase transition temperature of 55.1° C. About 8 to 9 mole percent of PEGylated surfactant, PEG 40 stearate sold by Sigma of St. Louis, Mo., was used as a steric stabilizer.

EXAMPLE 1

Figure 2A:
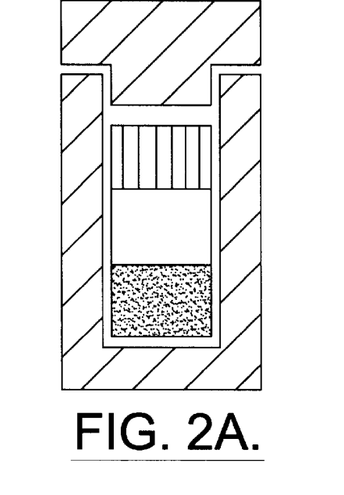
FIGS. 2A through D shows methods of achieving different cooling rates of microbubble samples: (A) in a loosely capped Thermos®; (B) in a beaker of tap water; (C) in a convection coil bath; and (D) in a syringe needle immersed in an ice water bath.

Gas microbubbles were produced by the probe sonication technique set forth above. The sample was present in a vial at an elevated temperature, more specifically between 70° C. to 80° C. The vial was placed in a small loosely capped thermos and allowed to cool gradually over a period of approximately 20 to 30 minutes as illustrated in FIG. 2A. Of the various cooling techniques observed in accordance with the invention, Applicants believed this to be the slowest cooling rate.

EXAMPLE 2

Figure 2B:
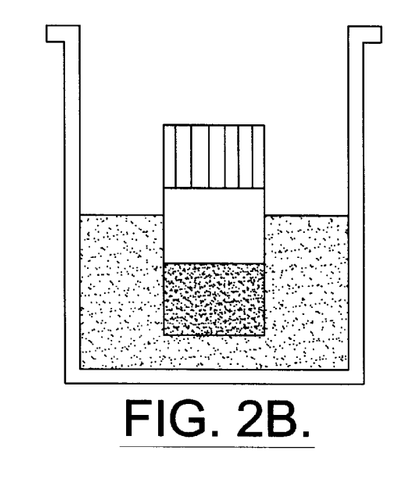

The procedure according to Example 1 was repeated with the following variations. A vial containing a gas microbubble sample having a temperature between 70° C. to 80° C. was placed in 25 mL of tap water at room temperature (e.g., 23° C. to 25° C.) in a 50 mL beaker. Room temperature was typically obtained in 5 minutes. The configuration is illustrated in FIG. 2B.

EXAMPLE 3

The procedure according to Example 1 was repeated with the following variations. A vial containing a gas microbubble sample having a temperature between 70° C. to 80° C. was cooled in a water bath with a temperature of 5° C. Room temperature was typically reached in 30 to 40 seconds after placement in the water bath. The temperature of the water bath was maintained by circulating cold water through a coil encircling the sample vial in the bath dish as set forth in FIG. 2C.

EXAMPLE 4

The procedure according to Example 1 was repeated with the following variations. A syringe needle was flushed with PBS buffer and warmed in the oven to 70° C. to 80° C. The needle was then attached to a 1 cc syringe and used to draw an aliquot from a gas microbubble sample having a temperature between 70° C. to 80° C. The amount of suspended microbubbles drawn into the syringe was sufficient to fill the needle. The filled needle was then plunged into a beaker of ice water. The needle and contents reached room temperature in 1–2 seconds after placement in the ice water bath. The method is depicted schematically in FIG. 2D. The microbubbles quenched in this manner exhibited viscous recovery to micropipet-induced deformation and negligible rigidity.

EXAMPLES 5–8

Figure 3A:
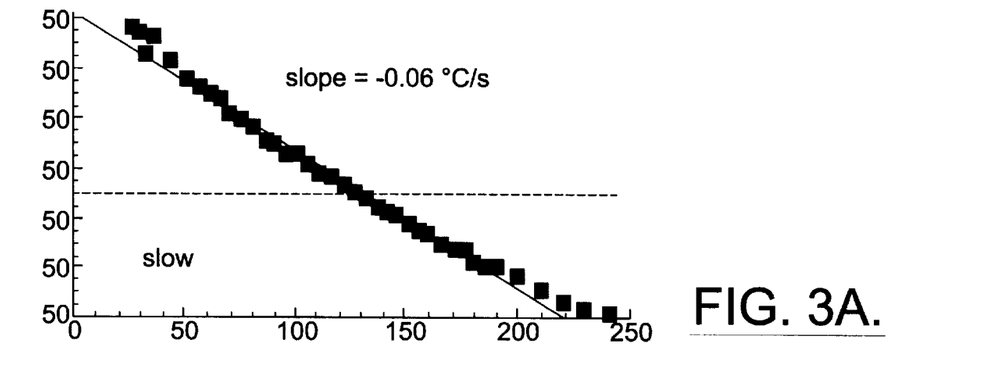
FIGS. 3A through C shows temperature changes with time in samples during the cooling stage for three of the methods (A, B, and C) in FIGS. 2A through D. Insets: cooling rate is given by slope of T vs. t through main phase transition. The differences in time scales in the insets are set forth at the right. The rate obtained by method 4 (cooling in syringe needle) is not shown but is estimated to be on the order of 25–50° C./s.
Figure 3B:
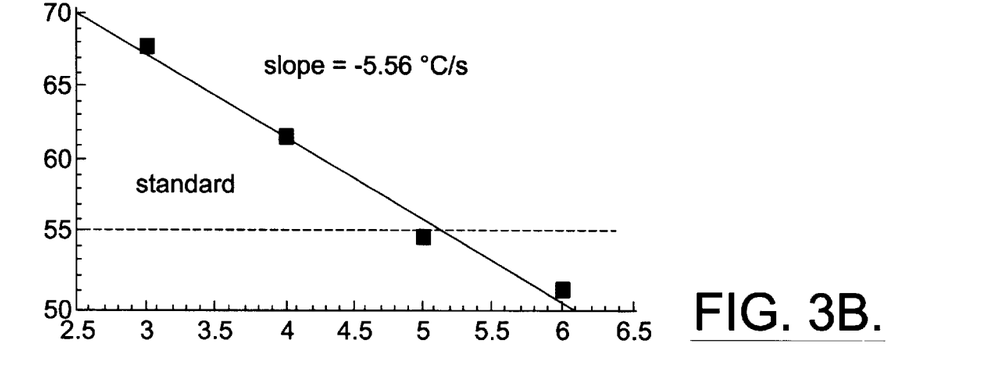
Figure 3C:
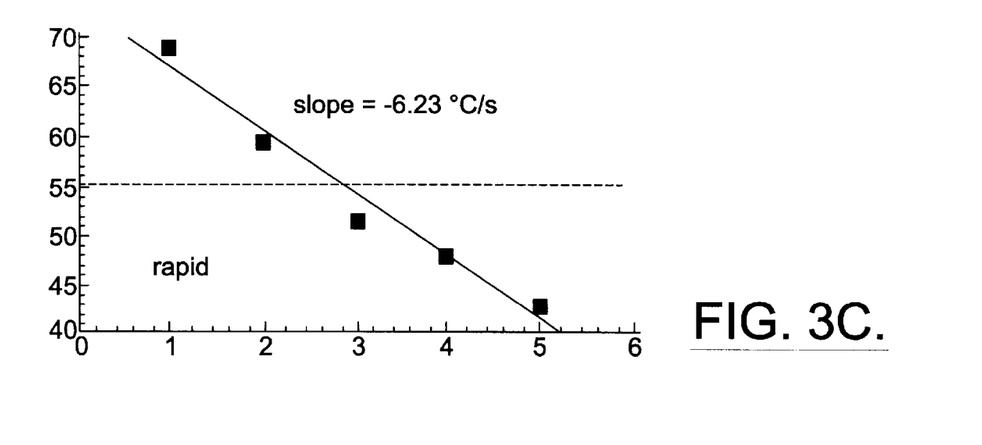

The cooling rates of the procedures carried out in Examples 1–4 were quantified as follows. 5 mL aliquots of water were heated to 65° C. and sonicated in the same manner as the liquid samples. A thermocouple (Omega model DP116 sold by Omega of Stamford, Conn.) was inserted through a small drill hole in the vial cap and immersed in water. The thermocouple was used to monitor the temperature at all stages during the process. The water temperature was recorded at intervals during the cooling stage and the cooling rate was obtained from the slope of the temperature-time curve through the main phase transition temperature. Cooling rates are set forth in FIGS. 3 A, B, and C.

EXAMPLE 5

Figures 2C, 2D:
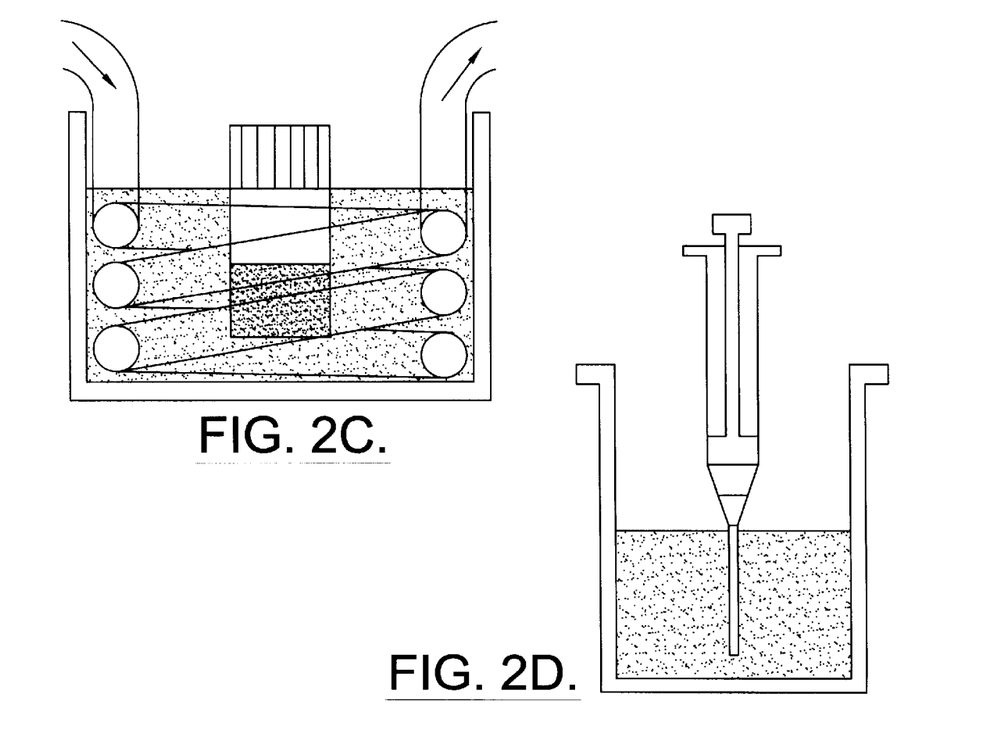

A sample was tested using a convection coil bath. The convection coil bath consisted of copper tubing (⅜" diameter) bent into a circular coil (4" diameter, 2.5" height). The ends of the coil were fitted with Tygon tubing and connected to a VWR Model 1166 circulator bath. The coil was placed in a Kimax glass crystallizing dish (125 mm diameter, 65 mm height) and the dish was placed in a foam insulator fashioned from packing material. The dish was filled with tap water to a height approximately 1 cm below the rim of the dish (FIG. 2C).

Figure 4A:
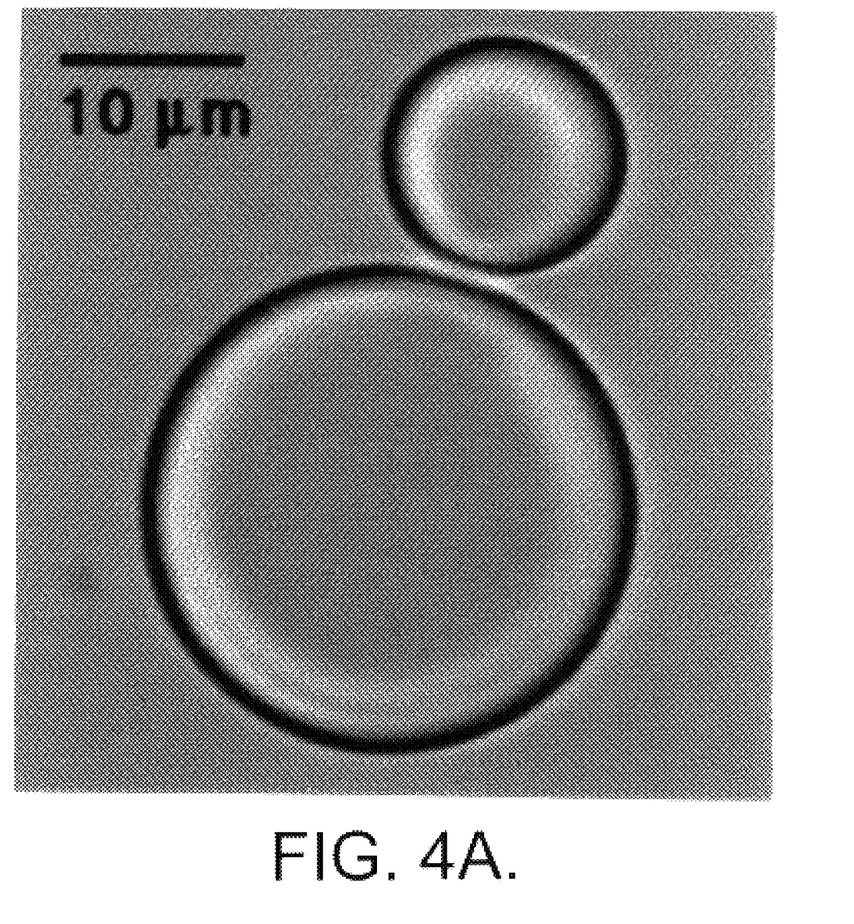
FIGS. 4A through B shows (A) bright field (left) and (B) epifluorescent (right) views of a representative bubble pair cooled at 3.3° C./min.
Figure 4B:
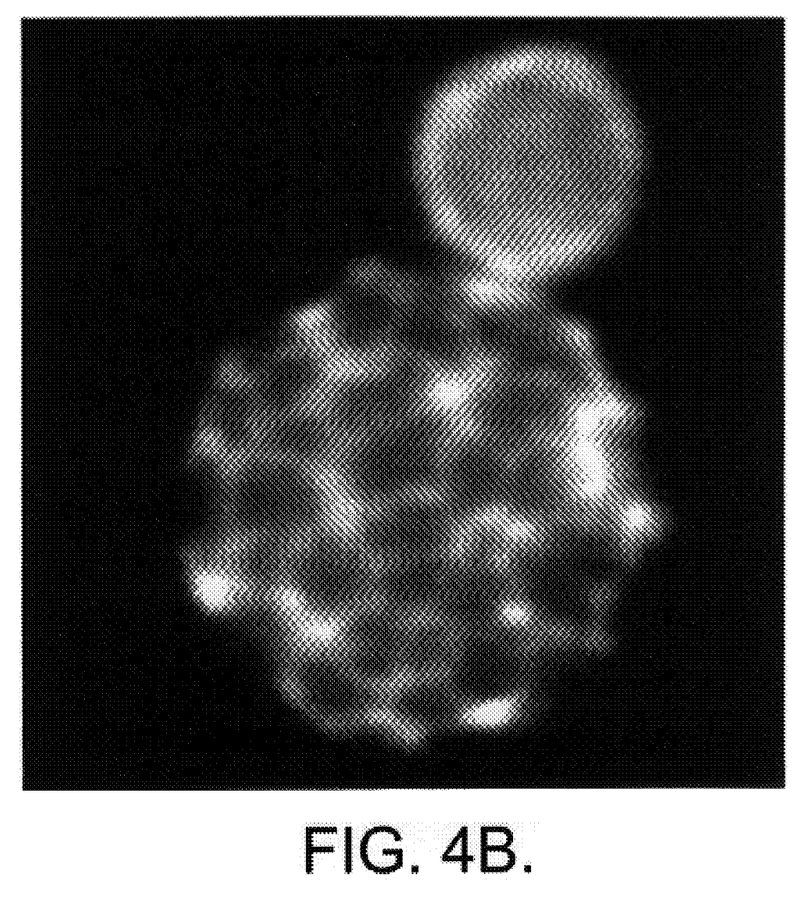

Although Applicants do not wish to be bound by any theory, fluorescent micrography and lipid mixtures doped with 0.1 mole percent BODIPY FL DPPE reveal the distribution of domain boundaries in the shell are believed to be due to the segregation of the dye lipid in the boundaries. FIGS. 4A and 4B illustrate the microstructural organization in the monolayer shell on typical gas bubbles for a slowly cooled sample (3.3° C. per minute). FIG. 4A represents a bright-field view and scale. FIG. 4B represents the same field as depicted in FIG. 4A viewed under epifluorescence.

EXAMPLE 6

Figure 5A:
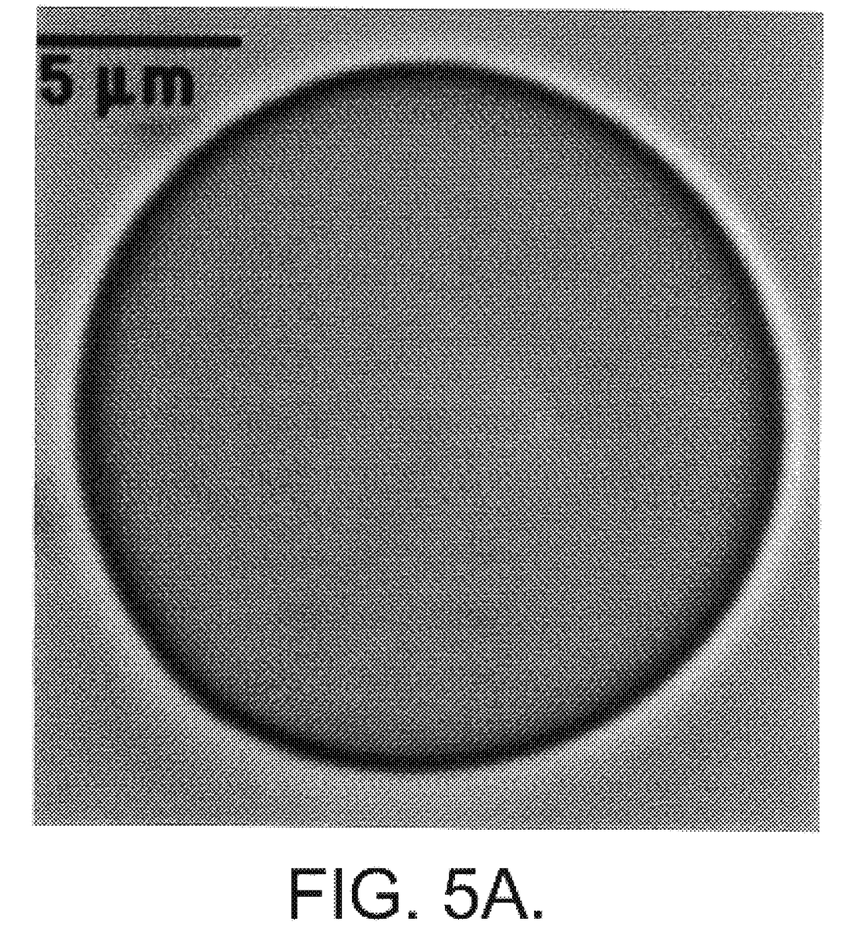
FIGS. 5A through B shows (A) bright field (left) and (B) epifluorescent (right) views of a representative bubble cooled at 334° C./min.
Figure 5B:
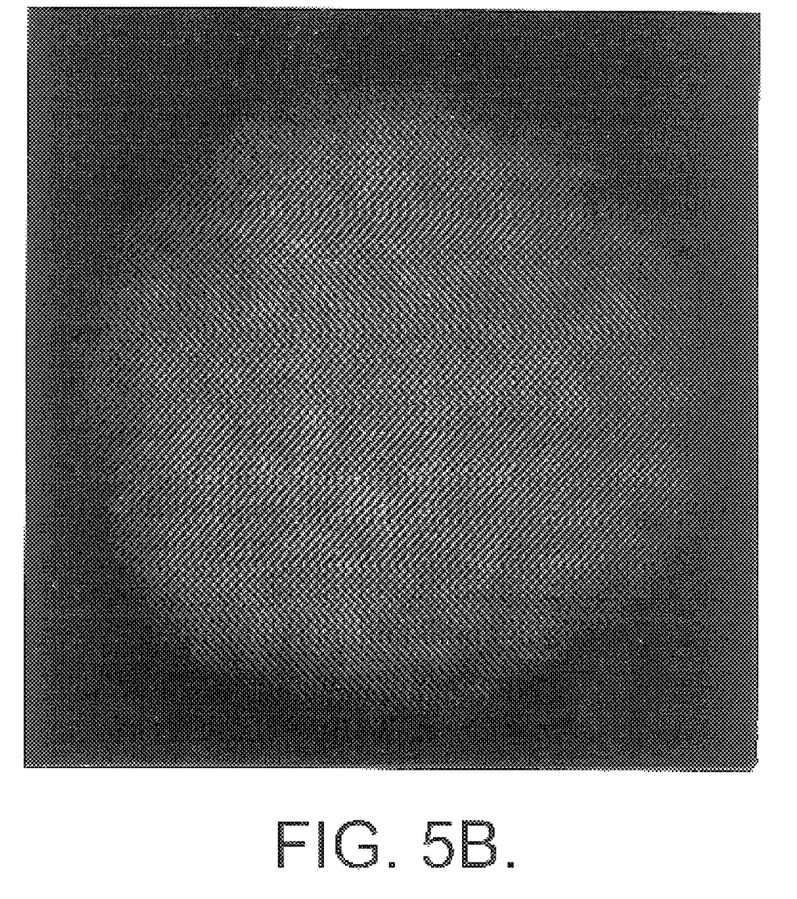

The procedure according to Example 4 was repeated except that the microbubbles were cooled at a rate of 334° C. per minute. As seen in FIG. 5, the resulting microbubble (FIG. 5A, in bright field microscopy, and FIG. 5B, epifluorescence) has a markedly different appearance in comparison to the microbubbles produced in Example 5. In particular, the more rapidly cooled microbubble of this example tends to exhibit a more uniform fluorescence over the surface of the bubble, possibly signifying smaller grain structure than resolvable by light microscopy.

EXAMPLE 7

Gas microbubbles having lipid-containing shells with 91:9 molar ratios of DSPC to PEG Stearate were formed and cooled. FIG. 1A illustrates yield shear versus cooling rate for these samples. FIG. 1B illustrates shear viscosity versus cooling rate for these samples.

EXAMPLE 8

Figure 6:
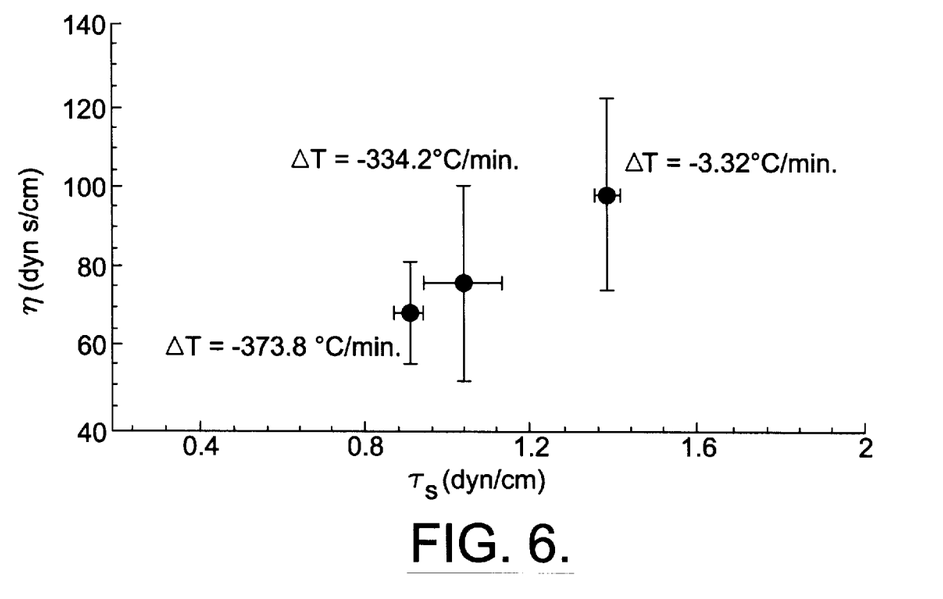
FIG. 6 shows a cross plot of yield shear ($\tau_s$) and shear viscosity ($\eta$) for DSPC bubbles processed at different cooling rates.

DSPC microbubbles were processed at various cooling rates in accordance with procedures set forth by the invention. FIG. 6 provides a cross plot of shear viscosity versus yield shear for these bubbles. The data suggests a trend of increasing yield shear and shear viscosity for slower cooling rates.

The foregoing examples are illustrative of the present invention, and are not to be construed as limiting thereof. The invention is described by the following claims, with equivalents of the claims to be included therein.

That which is claimed is:

1. A method for producing a gas microbubble having at least one lipid-containing shell formed thereon, said method comprising:

subjecting a gas microbubble to isothermal conditions or cooling conditions such that the lipid-containing shell cools at a rate ranging from about $10^{0°}$ C./min. to about $10^{3°}$ C./min., and wherein said subjecting step transforms the lipid-containing shell from a liquid state to a solid state.

2. The method according to claim 1, wherein the isothermal conditions are selected from the group consisting of exposing the gas microbubble to a dehydrating agent, exposing the gas microbubble to an electrolyte solution, and altering the surface charge density of the lipids in the lipid-containing shell.

3. The method according to claim 2, further comprising:

reducing the temperature of the gas microbubble; and removing the gas microbubble from the surrounding liquid medium.

4. The method according to claim 2, wherein the dehydration agent is a polymer having a molecular weight equal to or greater than $10^4$ daltons.

5. The method according to claim 1, wherein the lipid-containing shell is present as a monolayer.

6. The method according to claim 1, wherein the lipid-containing shell comprises a phospholipid.

7. The method according to claim 6, wherein the phospholipid is dipalmitoylphosphatidylcholine (DPPC).

8. A method for producing a gas microbubble in a surrounding liquid medium, said gas microbubble having at least one lipid-containing shell formed thereon, said method comprising:

forming a gas microbubble by a probe sonication process; and subjecting the gas microbubble to isothermal conditions or cooling conditions such that the lipid-containing shell cools at a rate ranging from about $10^0$° C./min. to about $10^3$° C./min., and wherein said subjecting step transforms the lipid-containing shell from a liquid state to a solid state.

9. The method according to claim 8, wherein the isothermal conditions are selected from the group consisting of exposing the gas microbubble to a dehydrating agent, exposing the gas microbubble to an electrolyte solution, and altering the surface charge density of the lipids in the lipid-containing shell.

10. The method according to claim 9, further comprising:

reducing the temperature of the gas microbubble; and removing the gas microbubble from the surrounding liquid medium.

11. The method according to claim 9, wherein the dehydration agent is a polymer having a molecular weight equal to or greater than about $10^4$ daltons.

12. The method according to claim 8, wherein the lipid-containing shell is present as a monolayer.

13. The method according to claim 8, wherein the lipid-containing shell comprises a phospholipid.

14. The method according to claim 13, wherein the phospholipid is dipalmitoylphosphatidylcholine (DPPC).

15. A method for producing a gas microbubble having at least one lipid-containing shell formed thereon, said method comprising:

subjecting a gas microbubble to cooling conditions such that the lipid-containing shell cools at a rate ranging from about $10^0$° C./min. to about $10^3$° C./min., and wherein said subjecting step transforms the lipid-containing shell from a liquid state to a solid state.

16. The method according to claim 15, wherein the dehydration agent is a polymer having a molecular weight equal to or greater than $10^4$ daltons.

17. The method according to claim 15, wherein the lipid-containing shell is present as a monolayer.

18. The method according to claim 15, wherein the lipid-containing shell comprises a phospholipid.

19. The method according to claim 15, wherein the phospholipid is dipalmitoylphosphatidylcholine (DPPC).

* * * * *